United States Patent [19]
Caughman, Jr.

[11] Patent Number: 5,858,226
[45] Date of Patent: *Jan. 12, 1999

[54] SELECTIVELY REMOVABLE GRAVITATIONAL AND VACUUM SLUDGE FILTRATION APPARATUS AND METHOD

[75] Inventor: Carl Russell Caughman, Jr., Houston, Tex.

[73] Assignee: Flo-Trend Systems, Inc., Houston, Tex.

[ * ] Notice: The term of this patent shall not extend beyond the expiration date of Pat. No. 5,681,460.

[21] Appl. No.: 848,523

[22] Filed: Apr. 28, 1997

Related U.S. Application Data

[63] Continuation-in-part of Ser. No. 533,399, Sep. 25, 1995, Pat. No. 5,681,460.

[51] Int. Cl.$^6$ .................................................. B01D 29/15
[52] U.S. Cl. ...................... 210/232; 210/341; 210/416.1; 210/486; 210/499
[58] Field of Search .................................... 210/232, 299, 210/416.1, 433.1, 483, 486, 499, 340, 341, 323.1

[56] References Cited

U.S. PATENT DOCUMENTS

| | | | |
|---|---|---|---|
| 301,460 | 8/1884 | Russell . | |
| 569,382 | 10/1896 | Knight | 210/486 |
| 599,757 | 3/1898 | Ziegler | 210/341 |
| 741,402 | 10/1903 | Holderman | 210/486 |
| 841,526 | 1/1907 | Hunt | 210/341 |
| 988,391 | 4/1911 | Shillington . | |
| 1,793,080 | 2/1931 | Glover | 210/433.1 |
| 2,391,716 | 12/1945 | Koupal | 210/340 |
| 2,568,085 | 9/1951 | Naugle | 210/341 |
| 3,115,822 | 12/1963 | Totten | 210/433.1 |
| 3,446,357 | 5/1969 | Gomella | 210/195 |
| 4,116,838 | 9/1978 | Lazzarotto | 210/486 |
| 4,253,955 | 3/1981 | Kline | 210/172 |
| 4,805,525 | 2/1989 | Bivens | 99/408 |
| 4,871,454 | 10/1989 | Lott | 210/205 |
| 4,968,423 | 11/1990 | McKale et al. | 210/486 |
| 5,069,784 | 12/1991 | Taniguchi et al. | 210/433.1 |
| 5,589,081 | 12/1996 | Harris | 210/499 |
| 5,595,654 | 1/1997 | Caughman, Jr. | 210/416.1 |

*Primary Examiner*—Christopher Upton
*Attorney, Agent, or Firm*—Keeling Law Firm

[57] ABSTRACT

A selectively removable gravitational and vacuum sludge filtration apparatus and method that provides for retrofit into a container and separation of the sludge solids from the sludge liquids therein. A pair of spaced vertically oriented filter assemblies each define a filtrate cavity therein and are connected by separator plates. The filter assemblies permit the flow of sludge liquids into the filtrate cavity, but not sludge solids. A separator divides each filtrate cavity into two cavity sections, a first filtrate cavity and a second filtrate cavity. Filtrate drains into first and second filtrate cavities by either vacuum or gravitational drainage, depending on the level of sludge within the container. Vacuum drainage occur in first or second filtrate cavity if either cavity is situated below the level of the sludge within the container. A first and second filtrate evacuation means provide for the evacuation of filtrate from the first and second filtrate cavities by the use of a vacuum pump. A set of fasteners hold the filter assemblies in the container and bias the filter assemblies against the container bottom. The fasteners may be released to provide for removal of the sludge filtration system from the container. Functionally applying this sludge filtration system provides a method of retrofitting a container with a sludge filtration system and removing filtrate from a sludge in the container.

16 Claims, 3 Drawing Sheets

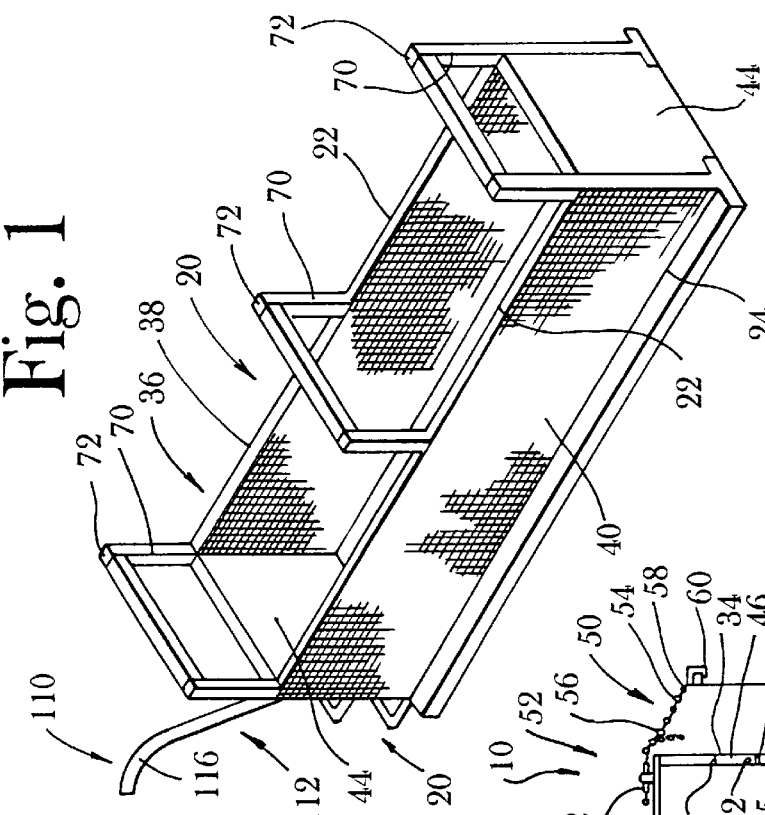
Fig. 1
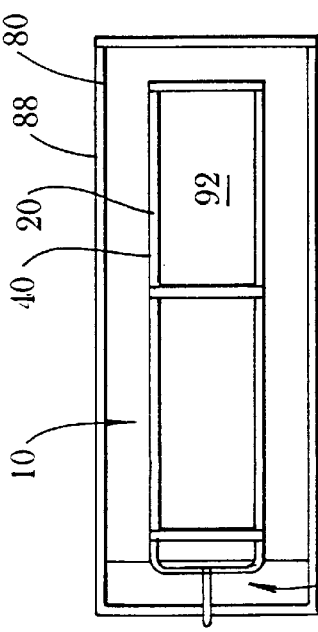
Fig. 3
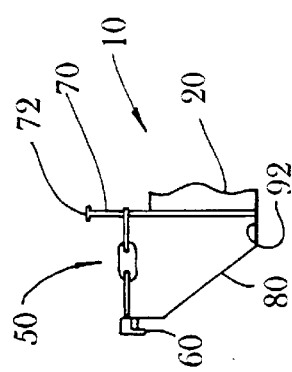
Fig. 5
Fig. 4

SELECTIVELY REMOVABLE GRAVITATIONAL AND VACUUM SLUDGE FILTRATION APPARATUS AND METHOD

This application is a continuation-in-part and claims the benefit of U.S. Nonprovisional Application Number 08/533,399 filed by Caughman, Jr. on Sep. 25, 1995, now U.S. Pat. No. 5,681,460.

BACKGROUND OF THE INVENTION

1. Field of Invention.

This invention relates to a filtering apparatus and method. More specifically, it is directed to a filtration apparatus, which uses both gravitational drainage and vacuum drainage, that is constructed for selective retrofitting into a container. The filtration apparatus extracts liquid from a sludge or slurry inside the container and separates the resulting liquids and solids for separate disposal or recovery.

Sludge includes any solid-liquid sludge and slurry such as sewage and industrial waste. The sludge may contain any ratio of liquids to solids. In fact, the sludge often has substantially more solid material than liquid material. Separation of the sludge into its liquid and solid components, also known as "dewatering," is desirable for recovery or disposal of one or both of the components.

One typical manner of dewatering sludge involves placing the sludge into a container that has filters therein. The liquid in the sludge passes through the filters and from the container. However, the filters do not permit the solids to pass therethrough. Therefore, the solids remain in the container and are removed after the dewatering operation is complete.

Generally, the fluid is drawn through the filter in one of two ways, vacuum drainage or gravitational drainage. Vacuum drainage requires the use of a pump in flow communication with the filtrate cavity of the filter. In order for the pump to develop a vacuum, the filtrate cavity must remain below the liquid surface level at all times.

Vacuum drainage often results in filter blockage. In this type of system, activation of the pump draws the sludge liquid as well as the sludge solids toward the filters. However, during the initial stages of dewatering when the liquid concentration is highest, the smaller sludge solid particles more readily flow toward the filter and tend to block the filter element. Blockage of the filter element hinders dewatering speed and efficiency.

Gravitational drainage does not require a vacuum and, therefore, does not require maintenance of the filtrate cavity below the sludge liquid surface. Consequently, the filters in such a system can extend the entire height of the container and, thereby, provide greater drainage surface area. Also, because gravitational drainage is slower than vacuum drainage, the sludge solid particles settle on the filter surface in a more uniform manner and provide an additional filtering layer. Thus, the filters do not experience blockage. However, as mentioned, gravitational drainage is relatively slow.

A filtration device which effectively and efficiently utilizes both vacuum and gravitational drainage gives a user more versatility in dewatering the sludge. In addition, the added assistance of vacuum drainage can speed up the dewatering process, extract more moisture from the sludge, and, in some cases, dewater a sludge that would not otherwise be considered feasible to dewater.

Moreover, a number of containers do not contain the filters needed for filtering the sludge because they are designed for more general purposes. Consequently, sludge dewatering generally requires special containers fitted with the needed filters. This need for specially designed dewatering containers causes waste of container resources.

2. Related Art

Filtering systems have long been known to the prior art. Illustrative of such systems are U.S. Pat. No. 301,460, U.S. Pat. No. 988,391, U.S. Pat. No. 3,446,357, and U.S. Pat. No. 4,253,955.

This Applicant's U.S. Pat. No. 5,595,654 ('654 Patent) discloses a Sludge Filtration System and Method which utilizes both gravitational drainage and vacuum drainage. However, the invention disclosed in the '654 Patent comprises a special container already pre-fitted with filters. Thus, the filters, container, and system of the '654 Patent may not be readily retrofitted for use in other general purpose containers.

Though the above mentioned filtering systems may be helpful for their stated purposes, they do not address the problem of retrofitting a general purpose container with filters to dewater sludge thereby providing faster and more efficient sludge dewatering and filtration by use of both gravitational and vacuum drainage.

SUMMARY OF THE INVENTION

Accordingly, the objectives of this invention are to provide, inter alia, a selectively removable sludge filtration apparatus and method that:

provides for fast, efficient filtration and dewatering of sludge;

provides for vacuum drainage of the sludge liquid while eliminating the problem of filter blockage;

provides both a vacuum drainage system and a gravitational drainage system independent of each other;

allows for selective or simultaneous gravitational drainage and vacuum drainage;

facilitates removal of the dewatered sludge solids from the system;

may be placed in and removed from a container; and includes connectors that maintain the filter in the container when the container is tilted for sludge solid removal.

Other objects of the invention will become apparent from time to time throughout the specification and claims as hereinafter related.

To achieve such improvements, my invention is a selectively removable gravitational and vacuum sludge filtration apparatus and method for separating sludge solids and sludge liquids. The sludge filtration apparatus includes at least one filter assembly that defines a filtrate cavity therein. An attachment means provides for selective attachment of the filter assembly in a container. The attachment means may maintain the filter assembly in the container, even when the container is tilted for sludge solid removal. The filtrate cavity is divided into two sections, a first filtrate cavity and a second filtrate cavity, by a separator. Filtrate drains into first and second filtrate cavities by either vacuum or gravitational drainage, depending on the level of sludge within the container. Vacuum drainage may occur in first or second filtrate cavity if either cavity is situated below the level of the sludge within the container. A first and second filtrate evacuation means provide for the evacuation of filtrate from the first and second filtrate cavities by the use of a vacuum pump. The filter assembly may be selectively inserted into or removed from a general purpose container and provide sludge filtration therein by the use of either or both vacuum drainage and gravitational drainage. Functionally applying this apparatus provides a method of retrofitting a general purpose container for sludge dewatering.

BRIEF DESCRIPTION OF THE DRAWING

The manner in which these objectives and other desirable characteristics can be obtained is explained in the following description and attached drawings in which:

FIG. 1 is an isometric view of the sludge filtration system without a container.

FIG. 3 is a top elevational view of the sludge filtration system positioned within a container.

FIG. 4 is a sectional view taken along lines 4—4 in FIG. 3 showing the filtrate cavity.

FIG. 5 is a sectional view taken along lines 5—5 in FIG. 3 showing the connection of the filter assembly to the front end of the container.

DETAILED DESCRIPTION OF THE INVENTION

Figure 2:
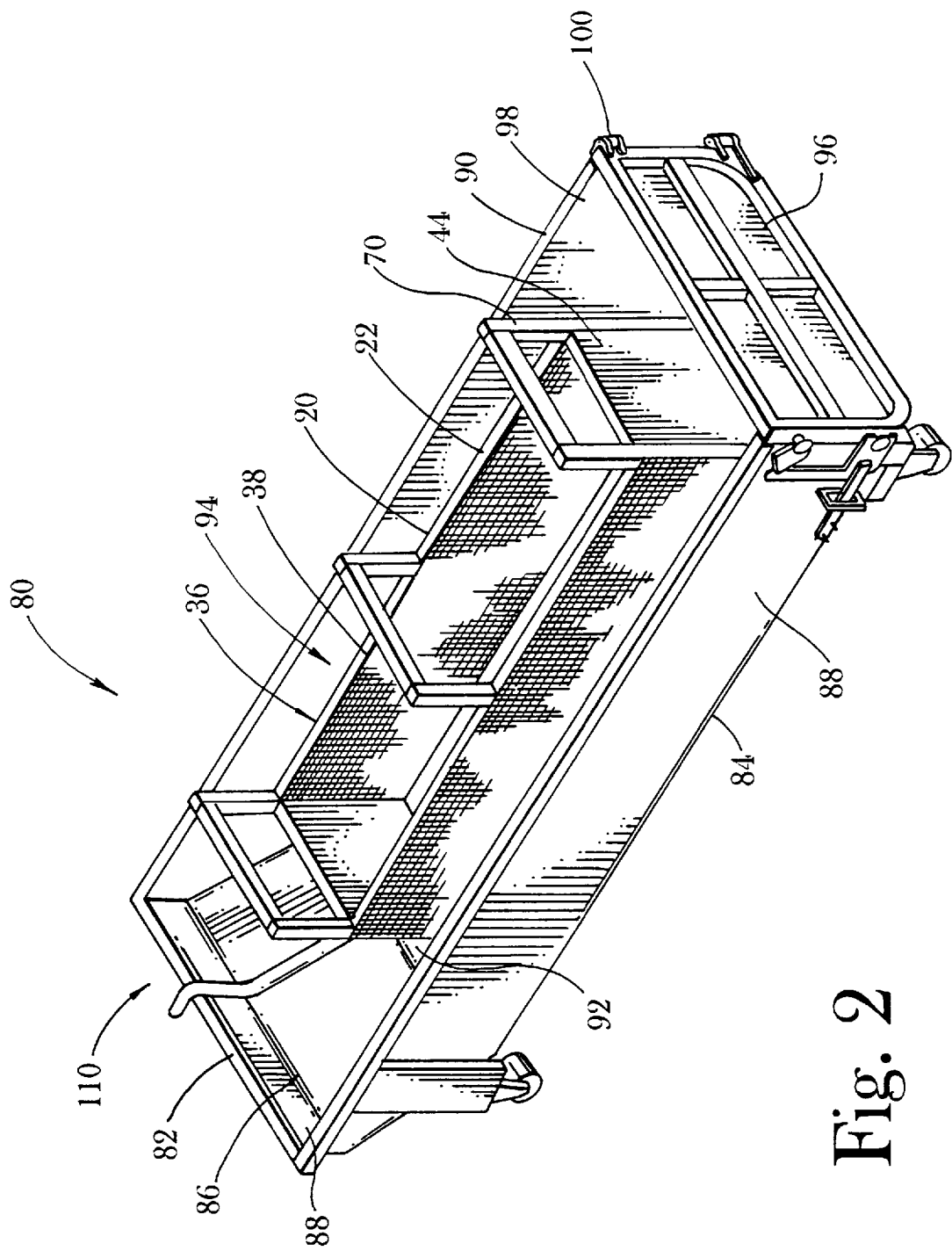
FIG. 2 is a side elevational view of the sludge filtration system positioned within a container.
Figure 6:
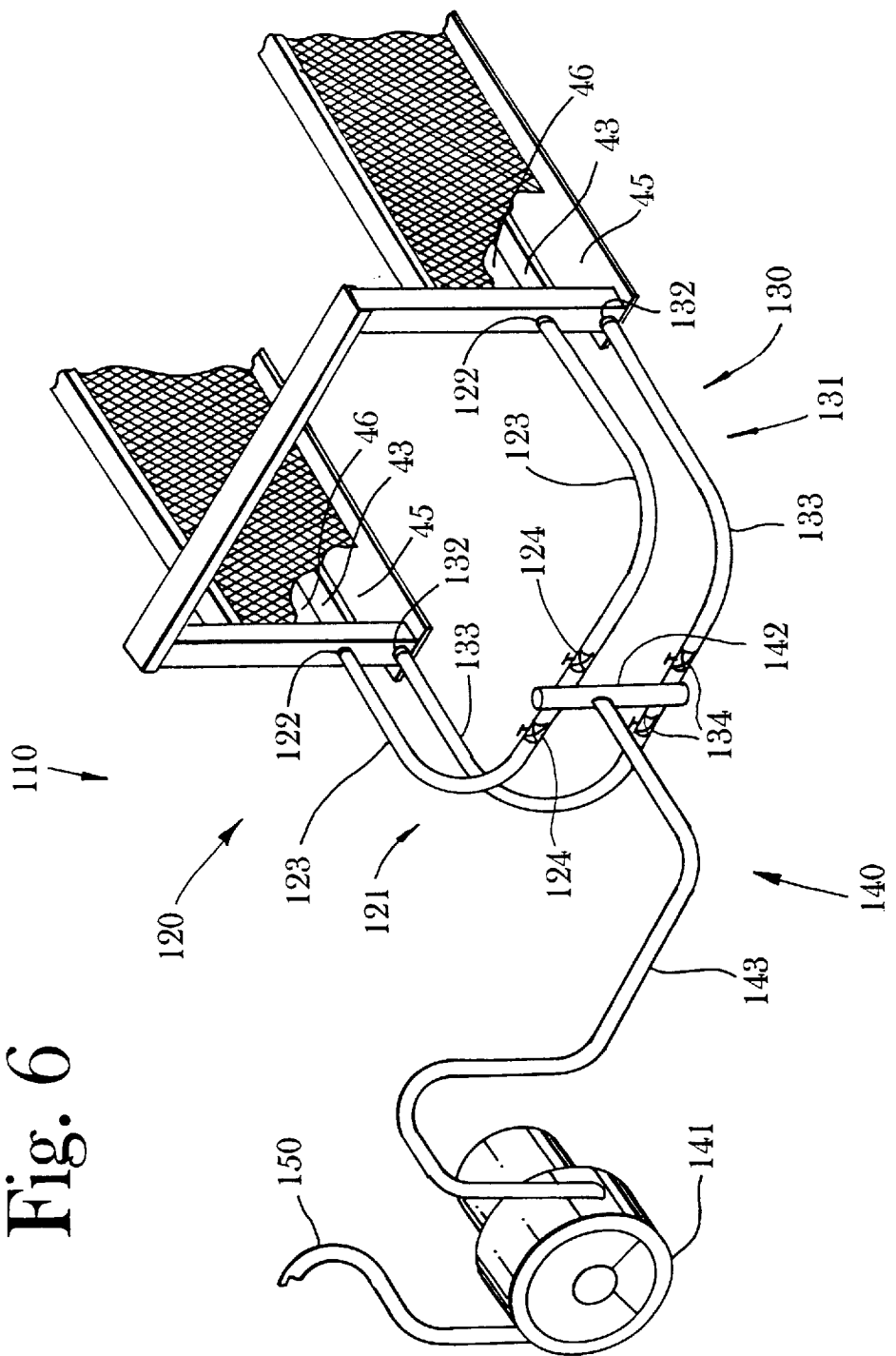
FIG. 6 is an isometric view of the filtrate removal means as attached as attached to the filtrate cavities.

The preferred embodiment of my invention is illustrated in FIGS. 1 through 6. The selectively removable sludge filtration apparatus is depicted as 10.

Generally, sludge includes, inter alia, any solid-liquid sludge and slurry such as sewage and industrial waste. As indicated, the sludge contains sludge solids and sludge liquids. In treating the sludge, it is desirable to separate the sludge liquids from the sludge solids for recovery or disposal of the individual components. The sludge filtration apparatus 10 provides for and facilitates the desired component separation.

Basically, the sludge filtration apparatus 10 comprises at least one filter assembly 20, at least one attachment means 50, and at least one filtrate removal means 110. The sludge filtration apparatus 10 construction permits selective placement and removal of the sludge filtration apparatus 10 in a container 80 to provide sludge filtration therein.

The container 80 is any container with the capability and capacity to receive and maintain the sludge therein. Generally, container 80 comprises a container bottom 92 at the container bottom end 84 and container side walls 88 extending upwardly from the perimeter of the container bottom 92. Container bottom 92 and container side walls 88 define a container cavity 94. Container bottom 92 and container side walls 88 are sealingly connected to prevent the escape of sludge liquid from container cavity 94.

To facilitate receipt of sludge into container 80, container top end 82 includes a container top opening 86. Container top opening 86 may simply comprise an open container top end 82 wherein the container has no cover and container opening 86 is defined by the upper edges of container side walls 88. Alternatively, in a container 80 having a cover, the container opening 86 may comprise an opening through the cover.

The construction of container 80 facilitates removal of dewatered sludge therefrom. In a first embodiment, one of the container side walls 88, the gate container side wall 96, rotatably connects to an adjacent side wall, the support container side wall 98, by a hinge 100. Alternatively, the gate container side wall 96 rotatably connects to both adjacent side walls by a hinge 100. In both embodiments, the gate container side wall 96 may selectively rotate to an open position and, thereby, provide a container side opening. With the gate side wall 96 in the open position, the dewatered sludge is more easily removed through the container side opening. In the closed position, however, the gate container side wall 96 sealingly mates with the container bottom 92 and the adjacent container side walls 88 to prevent the escape of sludge from the container 80.

A second preferable construction feature of the container 80 that promotes easy removal of the dewatered sludge therefrom is the tilt design. This tilt design may include any known hinged container 80 design or container 80 lifting design. Thus, the sludge filtration apparatus 10 must attach to the container 80 in such a way as remain in the container 80 during a container 80 tilt position.

In general, the filter assembly 20 comprises a rigid filter support 30 constructed to permit the flow of filtrate therethrough. Disposed upon the filter support 30, a filter media 40 filters the sludge liquid from the sludge solid. The filter media 40 porosity permits the flow of sludge liquids therethrough but prevents the flow of sludge solids therethrough. The sludge liquid that passes through the filter media 40, the filtrate, drains into the filtrate cavity 42 defined by the filter assembly 20.

Preferably, the rigid filter support 30 is a pair of substantially parallel side walls 32 held in spaced proximal relation by a connecting means 36. The side walls 32 are made of a rigid, permeable material, such as perforated plate. To maintain the substantially flat side walls 32 in proper position, the connecting means 36 comprises a substantially continuous and rigid connecting plate 38 that extends substantially about the perimeter 34 of the side walls 32. The side walls 32 each have a greater relative surface area than the connecting plate 38 sides. In this way, the connecting means 36 attaches the perimeter 34 of one of the side walls 32 to the perimeter 34 of the other side wall 32. Thus, the side walls 32 and connecting plate 38 form a box-like structure having two perforated walls 32. The walls, 32 and 38, of this box-like structure define the filtrate cavity 42 therebetween.

The sludge filtration apparatus 10 further comprises a separator 43 disposed within filtrate cavity 42. The separator 43 divides filtrate cavity 42 into two cavity sections, first filtrate cavity 45 and second filtrate cavity 46. Separator 43 is impermeable to the filtrate recovered from the sludge and seals first filtrate cavity 45 from second filtrate cavity 46.

To maximize the surface area in contact with the sludge, filter assembly 20 is preferably positioned with the side walls 32 vertically oriented. In this vertical position, first filtrate cavity 45 is preferably adjacent the container bottom 92, and the second filtrate cavity 46 is located above the first filtrate cavity 45. Since separator 43 is impermeable to filtrate, filtrate which filters into second filtrate cavity 46 does not seep or pass into first filtrate cavity 45.

Filtrate may drain into first filtrate cavity 45 and second filtrate cavity 46 by either vacuum or gravitational drainage, depending on the level of sludge within container 80. Vacuum drainage occurs when either cavity, 45 or 46, is sealed from atmospheric pressure and a suction pressure is applied thereto. Gravitational drainage occurs due to the flow and passage of filtrate from exterior filter media 40 into cavities, 45 and 46, due to the differential pressure across filter media 40, when cavity 45 or 46 is not sealed from the atmospheric pressure.

In order for vacuum drainage to occur in first filtrate cavity 45, a vacuum must be maintained in first filtrate cavity 45 and suction pressure must be applied in first filtrate cavity 45. In order to maintain a vacuum in first filtrate cavity 45, first filtrate cavity 45 must remain below the sludge level when sludge is contained in container 80. Thereby, first filtrate cavity 45 is sealed from the atmosphere, and a differential pressure is maintained in first filtrate cavity 45 that is lower than the atmospheric pressure.

In order for vacuum drainage to occur in second filtrate cavity 46, a vacuum must be maintained in second filtrate cavity 46 and suction pressure must be applied in second filtrate cavity 46. In order to maintain a vacuum in second filtrate cavity 46, the separator 43 and thus second filtrate cavity 46 must remain below the sludge level when sludge is contained in container 80. Thereby, second filtrate cavity 46 is sealed from the atmosphere, and a differential pressure is maintained in second filtrate cavity 46 that is lower than the atmospheric pressure.

It should be noted that because first filtrate cavity 45 is located below second filtrate cavity 46 (and thus will more likely be below the sludge level of container 80) vacuum drainage will be much more readily facilitated in first filtrate cavity 45 than in second filtrate cavity 46. However, if vacuum drainage is not facilitated in either first or second filtrate cavity, 45 and 46, filtrate will nevertheless drain into cavities, 45 and 46, by way of gravitational drainage.

At least one filtrate removal means 110 provides for evacuation of the filtrate from both first filtrate cavity 45 and second filtrate cavity 46. In a preferred embodiment, at least one filtrate removal means 110 comprises a first filtrate cavity evacuation means 120, a second filtrate cavity evacuation means 130, and a pumping means 140. First filtrate cavity evacuation means 120 is in fluid communication with first filtrate cavity 45; second filtrate cavity evacuation means 130 is in fluid communication with second filtrate cavity 46. In turn, first filtrate cavity evacuation means 120 and second filtrate cavity evacuation means 130 is each in fluid communication with pumping means 140. A vacuum/suction pressure created by pumping means 140 is thus able to remove the filtrate accumulated within first filtrate cavity 45 and second filtrate cavity 46 from filter assemblies 20 and container 80.

Preferably, first filtrate cavity evacuation means 120 comprises a first fluid communication passageway 121 that extends from and is in fluid communication with a first filtrate cavity lower end 119 to a position exterior of container 80 when the filter assembly 20 is inside container 80. Outside of container 80, first fluid communication passageway 121 is in fluid communication with pumping means 140. In an alternative preferred embodiment, first fluid communication passageway 121 is connected to pumping means 140 inside container 80.

In a preferred embodiment, first fluid communication passageway 121 includes a first port 122, a first flexible hose 123, and a first filtrate cavity valve means 124. First port 122 comprises an opening through a wall, 32 or 38, of filter assembly 20 which abuts first filtrate cavity 45. Thus, first port 122 provides fluid communication into first filtrate cavity 45. First flexible hose 123 is connected to and in fluid communication with first port 122. First flexible hose 123 is connected to and in fluid communication with pumping means 140. First filtrate cavity valve means 124 is located on first flexible hose 123 preferably immediately prior to the connection between first flexible hose 123 and pumping means 140. First filtrate cavity valve means 124 preferably comprises a conventional valve mechanism which, upon activation (close or open), can gradually decrease or increase or completely interrupt the flow of filtrate in first flexible hose 123.

Preferably, second filtrate cavity evacuation means 130 comprises a second fluid communication passageway 131 that extends from and is in fluid communication with a second filtrate cavity lower end 129 to a position exterior of a container 80 when the filter assembly 20 is in a container 80. Outside of container 80, second fluid communication passageway 131 is in fluid communication with pumping means 140. In an alternative preferred embodiment, second fluid communication passageway 131 is connected to pumping means 140 inside container 80.

In a preferred embodiment, second fluid communication passageway 131 includes a second port 132, a second flexible hose 133, and a second filtrate cavity valve means 134. Second port 132 comprises an opening through a wall, 32 or 38, of filter assembly 20 which abuts second filtrate cavity 46. Thus, second port 132 provides fluid communication into second filtrate cavity 46. Second flexible hose 133 is connected to and in fluid communication with second port 132. Second flexible hose 133 extends is connected to and in fluid communication with pumping means 140. Second filtrate cavity valve means 134 is located on second flexible hose 133 preferably immediately prior to the connection between second flexible hose 133 and pumping means 140. Second filtrate cavity valve means 134 preferably comprises a conventional valve mechanism which, upon activation (close or open), can gradually increase or decrease or completely interrupt the flow of filtrate in second flexible hose 133.

Pumping means 140 comprises a vacuum pump 141, a manifold 142, a conduit 143, and a pump discharge 150. Pump 141 includes a pump inlet end 151 and a pump discharge end 152. Conduit 143 is connected to and provides fluid communication between pump 141 and manifold 142. Conduit 143 is connected to pump 141 at pump inlet end 151. As previously disclosed, first flexible hose 123 and second flexible hose 133 are connected to and are in fluid communication with manifold 142. Thus, at manifold 142, conduit 143 and first and second flexible hoses, 123 and 133, are in fluid communication with each other. Pump 141 is any type of liquid pump that can maintain a vacuum when sealed from the atmosphere and that is capable of operating under a dry condition, but is preferably a peristaltic pump or a diaphragm pump. At pump discharge end 152, pump 141 is connected to and in fluid communication with pump discharge 150.

Attachment means 50 is for selectively attaching the filter assembly 20 in a container 80. Because container 80 may tilt for sludge removal, attachment means 50 must maintain filter assembly 20 in container 80 when in such position. Consequently, attachment means 50 preferably comprises a biasing means 52 for selectively applying and maintaining lateral and downward forces on filter assembly 20. The combined forces of a plurality of biasing means 52 maintain filter assembly lower end 24 against container bottom 92 and the filter assembly 20 in a fixed position within container 80. Such plurality of attachment means 50 prevent filter assembly 20 from sliding during a container 80 tilt condition. Inclusion of an attachment means 50 between filter assembly 20 and container side wall 88 that is distal gate container side wall 96, as shown in FIG. 5, enhances attachment means 50 during tilt conditions.

Because separator 43 must remain below the level of sludge when sludge is disposed within container 80 and because of a preferred downward biasing of attachment means 50, attachment means 50 preferably includes an extension member 70 that extends upward from filter top end 22. When filter assembly 20 is positioned in container 80, extension member upper end 72 reaches above container top 82.

Generally, the preferred biasing means 52 includes a fastener 54, a clamping means 60, and a tightening means 62. Fastener 54 has a fastener first end 56, and a fastener second end 58. The fastener first end 56 connects to the upper end 72 of the extension 70. A clamping means 60 at fastener second end 58 enables selective connection of fastener second end 58 to container wall top end 90. A tightening means 62 for pulling fastener second end 58 toward upper end 72 of extension member 70 provides the downward biasing of biasing means 52. The length of the fastener 54 may be either a predetermined, substantially constant length or an adjustable length. Either length design may aid in tightening and biasing the biasing means 52.

In a preferred embodiment, sludge filtration apparatus 10 includes two filter assemblies 20 maintained in spaced parallel relation by at least one filter assembly support plate 44. In this embodiment, each filter assembly 20 is connected to and is in fluid communication with a first filtrate cavity evacuation means 120 and a second filtrate cavity evacuation means 130. Furthermore, each first filtrate cavity evacuation means 120 and each second filtrate cavity evacuation means 130 is connected to and is in fluid communication with pumping means 140 as previously disclosed herein.

In operation, a user places sludge filtration apparatus 10 in a container 80 and secures such apparatus 10 within the container 80 by a plurality of attachment means 50. Inherently, container 80 must be large enough to hold sludge filtration apparatus 10. Specifically, container 80 must be large enough to hold the filter assemblies 20 of sludge filtration apparatus 10.

Once sludge filtration apparatus 10 is secured within container 80, a user deposits sludge inside container 80 so that the sludge surrounds filter assemblies 20. Since filter media 40 of filter assemblies 20 is permeable to sludge liquid, in time, sludge liquid, also known as filtrate, passes through filter media 40 into first filtrate cavity 45 and second filtrate cavity 46.

As previously disclosed, filtrate drains into first filtrate cavity 45 by way of vacuum drainage if separator 43 and first filtrate cavity 45 remain below the level of the sludge within container 80 and if a suction pressure is applied in first filtrate cavity 45. It must be noted, however, that if the level of the sludge is below separator 43 and first filtrate cavity 45, filtrate drains into first filtrate cavity 45 by gravitational drainage, as previously disclosed. It should also be noted that, although unlikely, it is possible that the level of sludge within container 80 may completely cover second filtrate cavity 46 as well as first filtrate cavity 45. In this case, if suction pressure is applied in first and second filtrate cavities, 45 and 46, filtrate drains into both first and second filtrate cavities, 45 and 46, by vacuum drainage.

Once pump 141 is engaged and as long as there is fluid communication between pump 141 and filtrate cavity 42, pump 141 will begin to remove the filtrate from first filtrate cavity 45 and second filtrate cavity 46. As previously disclosed, fluid communication between pump 141 and first filtrate cavity 45 may be decreased or interrupted by activating (closing or opening) first filtrate cavity valve means 124. Also as previously disclosed, fluid communication between pump 141 and second filtrate cavity 46 may be decreased or interrupted by activating (closing or opening) second filtrate cavity.valve means 134.

If first filtrate cavity valve means 124 is not closed while pump 141 is engaged and the sludge level in container 80 is above separator 43, pump 141 creates a suction pressure within first filtrate cavity 45. Pump 141 thus produces the desired differential pressure that is lower than the atmospheric pressure within first filtrate cavity 45. The vacuum created by pump 141 within first filtrate cavity 45 will cause vacuum drainage of filtrate outside of filter assemblies 20 into first filtrate cavity 45. With the aid of the suction created by pump 141, filtrate will thus flow from first filtrate cavity 45 out of first port 122, through first flexible hose 123 and first filtrate cavity valve means 124, into manifold 142, through conduit 143 and pump 141, and out of sludge filtration apparatus 10 by way of pump discharge 150.

If first filtrate cavity valve means 124 is not closed while pump 141 is engaged, and the sludge level in container 80 is below separator 43, pump 141 will not create a vacuum within first filtrate cavity 45. Filtrate will nevertheless permeate from outside filter assemblies 20 into first filtrate cavity 45 by gravitational drainage and will flow out pump discharge 150 as heretofore described with the aid of pump 141.

If second filtrate cavity valve means 134 is not closed while pump 141 is engaged, and the sludge level in container 80 is above second filtrate cavity 46, pump 141 creates a suction pressure within second filtrate cavity 46. Pump 141 thus produces the desired differential pressure that is lower than the atmospheric pressure within second filtrate cavity 46. The vacuum created by pump 141 within second filtrate cavity 46 will cause vacuum drainage of filtrate outside of filter assemblies 20 into second filtrate cavity 46. With the aid of the suction created by pump 141, filtrate will thus flow from second filtrate cavity 46 out of second port 132, through second flexible hose 133 and second filtrate cavity valve means 134, into manifold 142, through conduit 143 and pump 141, and out of sludge filtration apparatus 10 by way of pump discharge 150.

If second filtrate cavity valve means 134 is not closed while pump 141 is engaged, and the sludge level in container 80 does not completely cover second filtrate cavity 46, pump 141 will not create a vacuum within second filtrate cavity 46. Filtrate will nevertheless permeate from outside filter assemblies 20 into second filtrate cavity 46 by gravitational drainage and will flow out pump discharge 150 as heretofore described with the aid of pump 141.

By closing first filtrate cavity valve means 124 and/or second filtrate cavity valve means 134, a user may evacuate filtrate from only first filtrate cavity 45, from only second filtrate cavity 46, or from first and second filtrate cavities, 45 and 46, simultaneously. Furthermore, if sludge filtration apparatus 10 includes more than one filter assembly 20 (as in the preferred embodiment), a user may close the first filtrate cavity valve means 124 and the second filtrate cavity valve means 134 of one filter assembly 20 so as to drain the filtrate out of only one filter assembly 20 at a time.

Many different types of sludge, with different solid particle sizes as well as different liquid-to-solid ratios, may be deposited into container 80 for filtration. The activation of the filtrate cavity valve means, 124 and 134, and thus vacuum and gravitational drainage provides versatility in dewatering the sludge.

Once the sludge has been adequately dewatered by way of the above process, the user may remove the remaining sludge solid from container 80. As previously disclosed, the user may empty container 80 by tilting container 80 (if not inherently built with a tilt). A use may also find it helpful to open gate container side wall 96 and allow the sludge solids to flow out of container 80. Or, the user may empty container 80 by scooping the remaining sludge solids out of container 80 with a shovel or the like.

Functionally applying the above described sludge filtration apparatus 10 provides a method of retrofitting a container 80 with a sludge filtration apparatus 10 and removing filtrate from a sludge in the container 80 by using both gravitational drainage and vacuum drainage.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A sludge filtration apparatus, comprising:

at least one filter assembly defining a filtrate cavity;

said at least one filter assembly selectively insertable into or removable from a container to provide for sludge filtration therein;

said container including container side walls and a container bottom defining a container cavity;

at least one attachment means for selectively attaching said at least one filter assembly in said container;

said at least one attachment means including biasing means for selectively applying and maintaining a lateral and a downward force on said filter assembly thereby retaining said filter assembly in a fixed lateral position in relation to said container walls and with a filter assembly bottom surface juxtaposed against said container bottom;

whereby said attachment means, when engaged, maintaining said at least one filter assembly in a fixed position relative to said container when said container is in a normal, upright position and when said container is in a tilted position;

said at least one attachment means including an extension member extending upward from a filter top end of said at least one filter assembly;

said extension member extending above a top of said container when said at least one filter assembly is positioned in said container;

said biasing means engaging said extension member;

said biasing means comprising a fastener having a fastener first end and a fastener second end;

said fastener first end connected to an upper end of said extension member;

said biasing means further comprising a clamping means for selectively connecting said fastener second end to a container wall top end;

said biasing means further comprising a tightening means for pulling said fastener second end toward said upper end of said extension member;

a separator disposed within said filtrate cavity;

said separator dividing said filtrate cavity into a first filtrate cavity and a second filtrate cavity;

at least one filtrate removal means operatively connected to said first filtrate cavity and said second filtrate cavity;

said at least one filtrate removal means selectively engagable with said first filtrate cavity and said second filtrate cavity concurrently; and said at least one filtrate removal means selectively engagable with each of said first filtrate cavity and said second filtrate cavity independently.

2. A sludge filtration apparatus as claimed in claim 1 wherein said at least one filter assembly comprises:

a rigid filter support;

said support including perforations which permit the flow of filtrate therethrough;

a filter media disposed on and attached to said filter support;

said filter media permitting the flow of filtrate therethrough; and said filter media preventing the flow of sludge solids therethrough.

3. A sludge filtration apparatus as claimed in claim 2 wherein said rigid filter support comprises:

a pair of substantially parallel side walls; and connecting means for maintaining said side walls in spaced proximal relation.

4. A sludge filtration apparatus as claimed in claim 3 wherein said side walls comprise perforated plate.

5. A sludge filtration apparatus as claimed in claim 3 wherein said connecting means comprises:

a substantially continuous and rigid connecting plate extending substantially about a perimeter of said side walls; and thereby connecting said perimeter of one of said side walls to said perimeter of the other of said side walls.

6. A sludge filtration apparatus as claimed in claim 1 wherein said biasing means comprises said fastener having a predetermined, substantially constant length.

7. A sludge filtration apparatus as claimed in claim 1 wherein said biasing means comprises said fastener having an adjustable length.

8. A sludge filtration apparatus as claimed in claim 1 wherein said at least one filtrate removal means comprises:

a first filtrate cavity evacuation means;

a second filtrate cavity evacuation means;

said first filtrate cavity evacuation means in fluid communication with said first filtrate cavity;

said second filtrate cavity evacuation means in fluid communication with said second filtrate cavity;

a pumping means; and said first and second filtrate cavity evacuation means in fluid communication with said pumping means.

9. A sludge filtration apparatus as claimed in claim 8, wherein said first filtrate cavity evacuation means comprises a first fluid communication passageway extending from a lower end of said first filtrate cavity to said pumping means.

10. A sludge filtration apparatus as claimed in claim 9 wherein said first fluid communication passageway comprises:

a first port extending through a wall of said at least one filter assembly abutting said first filtrate cavity;

said first port in fluid communication with said first filtrate cavity;

a first hose in fluid communication with said first port;

said first hose in fluid communication with said pumping means;

a first filtrate cavity valve means; and said first filtrate cavity valve means controlling the flow of filtrate through said first hose.

11. A sludge filtration apparatus as claimed in claim 8 wherein said second filtrate cavity evacuation means comprises a second fluid communication passageway extending from a lower end of said second filtrate cavity to said pumping means.

12. A sludge filtration apparatus as claimed in claim 11 wherein said second fluid communication passageway comprises:

a second port extending through a wall of said at least one filter assembly abutting said second filtrate cavity;

said second port in fluid communication with said second filtrate cavity;

a second hose in fluid communication with said second port;

said second hose in fluid communication with said pumping means;

a second filtrate cavity valve means; and said second filtrate cavity valve means controlling the flow of filtrate through said second hose.

13. A sludge filtration apparatus as claimed in claim 8 wherein said pumping means comprises:

a pump for creating a differential pressure that is lower than the atmospheric pressure in said first and second filtrate cavity and for removing filtrate from said first and second filtrate cavity;

said pump having an inlet end and a discharge end;

a manifold;

said manifold in fluid communication with said first and second hose;

a conduit providing fluid communication between said manifold and said pump inlet end; and a pump discharge in fluid communication with the discharge end of said pump.

14. A sludge filtration apparatus as claimed in claim 1 comprising two filter assemblies.

15. A sludge filtration apparatus as claimed in claim 14 further comprising:

at least one filter assembly support plate; and said filter assembly support plate constructed and positioned to maintain said filter assemblies in spaced parallel relation.

16. A sludge filtration apparatus comprising:

two filter assemblies each defining a filtrate cavity;

a separator disposed within each of said filtrate cavities;

said separator dividing each of said filtrate cavities into a first filtrate cavity and a second filtrate cavity;

a plurality of filter assembly support plates extending between said two filter assemblies;

said plurality of filter assembly support plates maintaining said filter assemblies in spaced parallel relation;

each of said filter assemblies including a rigid filter support;

each of said filter supports including perforations which permit the flow of filtrate therethrough;

each of said filter assemblies also comprising a filter media disposed on and attached to each of said filter supports;

said filter media permitting the flow of filtrate therethrough;

said filter media preventing the flow of sludge solids therethrough;

at least one extension member extending upward from a filter top end of said filter assemblies;

said at least one extension member constructed to extend above a top of said container when said at least one filter assembly is positioned in said container;

a fastener having a fastener first end and a fastener second end;

said fastener first end connected to an upper end of said extension member;

clamping means for selectively connecting said fastener second end to a container wall top end;

tightening means for pulling said fastener second end toward said upper end of said extension member;

a first fluid communication passageway a second fluid communication passageway;

a pump;

said first fluid communication passageway extending from a lower end of said first filtrate cavity;

said first fluid communication passageway in fluid communication with said first filtrate cavity and said pump;

said second fluid communication passageway extending from a lower end of said second filtrate cavity;

said second fluid communication passageway in fluid communication with said second filtrate cavity and said pump; and whereby said filter assemblies may be selectively inserted into or removed from said container to provide for sludge filtration therein.

* * * * *